United States Patent [19]

Rhodes

[11] 4,364,183

[45] Dec. 21, 1982

[54] HELIOSTAT-ADJUSTING SOLAR SIGHT

[76] Inventor: William A. Rhodes, 4421 N. 13th Pl., Phoenix, Ariz. 85014

[21] Appl. No.: 113,774

[22] Filed: Jan. 21, 1980

[51] Int. Cl.³ .............................................. G01C 1/00
[52] U.S. Cl. ...................................... 33/268; 33/227; 33/282
[58] Field of Search ................. 33/282, 268, 270, 269, 33/228, 227; 356/147, 140, 154, 138, 139; 350/162 R

[56] References Cited

U.S. PATENT DOCUMENTS

| | | | |
|---|---|---|---|
| 165,828 | 7/1875 | Holton | 33/269 |
| 2,472,420 | 6/1949 | Hagner | 33/268 X |
| 2,482,749 | 9/1949 | Eckert | 33/268 |
| 2,956,170 | 10/1960 | Sibley | 350/162 R X |
| 3,477,131 | 11/1969 | Warth et al. | 33/278 X |
| 3,920,335 | 11/1975 | Seehase | 356/138 |
| 3,947,973 | 4/1976 | Dunn | 33/270 |

Primary Examiner—William D. Martin, Jr.
Attorney, Agent, or Firm—Don J. Flickinger

[57] ABSTRACT

A solar sight having a scale calibrated in terms of solar declination angle and reflector angle is provided with diffraction pattern forming means comprising a movable sighting tube which, when directed at the sun, provides a Fresnel pattern on a viewing surface, which pattern indicates when said sighting tube is in proper alignment such that its axis is parallel to that of the incoming rays of the sun. The solar sight is portable and may be moved about on a heliostat so as to adjust the operation of the heliostat clock drive to agree with local sun time and to adjust the heliostat reflector tilt angle so that the sun's rays are reflected along or parallel to the polar axis. Movement of the sighting tube causes the movement of a vernier plate bearing an index which permits readout of the solar declination in degrees north or south declination. The vernier scale permits the reading of solar declination angles to 0.1° and the establishment of reflector angles to 0.2°. No optical elements (lenses) are employed within the diffraction tube. Use of the solar sight herein disclosed makes practical the use of a heliostat by persons of average economic means.

9 Claims, 9 Drawing Figures

HELIOSTAT-ADJUSTING SOLAR SIGHT

BACKGROUND OF THE INVENTION

1. Field of the Invention

The invention relates to instrumentation for determining the angular disposition of the sun. In particular, the invention relates to instrumentation for aligning a heliostat so as to provide a stationary light beam output therefrom.

2. Description of the Prior Art

A heliostat is a device known in the prior art. A heliostat, through the use of an automated reflector, tracks the passage of the sun in a manner so as to provide a stationary reflected beam output from the tracking reflector. As with all celestial tracking equipment, the heliostat must be oriented in azimuth and in elevation. The azimuth line of orientation is a true north-sourth meridian. The elevation angle is the polar angle defining the local elevation angle between Earth and the celestial pole. Once established, the azimuthal axis and the polar axis remain as fixed references for the heliostat device. The position of the sun, however, is a variable which must be tracked with reasonable accuracy if a stationary reflected beam output of the heliostat is to result.

The sun appears to move across our skies in an east to west direction. Its apparent movement, however, is not of uniform rate. Therefore, conventional clockwork mechanisms, when used in a solar tracking device, will frequently fall ahead or behind the sun in its apparent traversal of our skies. A second variable is introduced in that the elevation angle of the sun in our sky varies from day to day, season to season. The variation of the sun's elevation angle must also be considered in any solar tracking device.

The solar elevation angle is related to the polar axis by the general term: solar declination. The solar declination is the angular deviation from perpendicularity of the sun's rays with respect to the polar axis. If the sun's rays strike the polar axis at an angle of 90°, the solar declination is said to be 0°. This is the situation at the spring equinox. As the sun moves higher in the sky, its rays in their intersection with the polar axis appear to be leaning toward the northern disposition of the polar axis until at the summer solstice the solar declination is said to be about 23.5° north. Having achieved its height at the peak of summer, the sun then begins its descent once more achieving 0° solar declination in the autumn equinox and continuing to decline in the sky with its rays striking the polar axis in a manner which is depicted as though they were leaning toward the southern extreme of the polar axis. As the elevation angle of the sun in the sky continues to decrease, the solar declination increases to approximately 23.5° south at the time of the winter solstice. The cycle is repeated annually with the solar declination moving from south 23.5° to north 23.5° and back to south 23.5° each year.

The operation of the heliostat must take into account this variation in the rate of travel of the sun across the sky and the cyclical nature of the solar declination. The heliostat in itself would appear to be a simple device. A mirror is positioned so that the sun's rays striking its surface are reflected at an angle which causes the reflected rays to travel along or parallel to the polar axis. In order to maintain the reflected rays parallel to the polar axis, a clock work mechanism is provided to rotate the mirror as the sun advances across the sky. The mirror is tilted about an axis which is perpendicular to the polar axis and whose projection would lie along an eastwest aximuth line. The mirror tilt angle, however, is not a fixed reference since the mirror must be adjusted to account for the biannual variations in solar declination. So too, an ordinary clock work mechanism will not cause the mirror to faithfully track the sun in its path across the sky since the rate of the sun's travel is not uniform. The basic heliostat, in and of itself, is a relatively inexpensive device. However, if recourse must be had to special, for example computerized, devices for maintaining the alignment of the heliostat with the daily variations in the sun's cycles, its cost rapidly becomes prohibitive. In a general way, the same statement may be made for most devices, such as telescope mounts, which are designed to track the passage of the sun.

It is an object of the invention to provide a relatively inexpensive device which permits the rapid alignment of heliostats and similar equipment permitting the alignment to be made simply and with precision.

A further object of the invention is to provide a solar sighting device which is readily portable and easily positioned for purposes of aligning a heliostat or similar equipment.

It is a more specific objective of the invention to provide a solar sighting device which, while optically sensitive and precise, requires no optical elements.

It is a further specific objective of the invention to provide a solar sight having an elevation scale readout calibrated in terms of solar declination and of heliostat mirror tilt angle.

SUMMARY OF THE INVENTION

A simple channel beam provides the base for a lightweight, portable solar sight, or clinometer. A defraction tube is rotatably pivoted about a point above the channel base. This diffraction tube provides a Fresnel diffraction pattern on a viewing surface when the end of the diffraction tube furthest from the viewing surface is directed toward a light source. When the diffraction tube is pointed directly at the sun or other light source, the Fresnel pattern presented, as seen by the naked eye, is a relatively uniformly bright gray field enclosed by a dark annulus. A scale is provided which is calibrated so as to read the solar declination when the base of the solar sight is placed parallel with the polar axis of the heliostat and the diffraction tube is rotated so as to bring it to bear directly on the sun. The scale further provides calibration markings such that the diffraction tube may be adjusted, once the solar declination has been determined, so as to align the reflective surface of the mirror at the proper aspect angle to cause light from the sun incident on the mirror to be reflected along or parallel to the polar axis. A special marking on the scale permits the diffraction tube to be adjusted so as to be perpendicular to its base. With the solar sight placed such that its longitudinal axis is parallel to the tilt axis of the reflector, the rotation of the mirror about the polar axis may be corrected to overcome any deviation caused by a difference in the rate of the clock work mechanism which rotates the mirror and the rate of passage of the sun as it appears to traverse the sky from east to west. The teachings herein disclose both the solar sight apparatus and the method on which it may be used on a heliostat. Those skilled in the art will recognize its utility in aligning many other solar tracking devices.

A more detailed description of the invention follows. Reference to the accompanying drawings will facilitate understanding and practice of the invention.

DETAILS OF THE INVENTION

The name heliostat is derived from the Greek and is taken to mean literally a static or stationary sun. The ideal heliostat provides a reflected sunbeam which is constant throughout the day in its illumination of a fixed predetermined area. Although the sun may appear to move across the sky, the reflected sunbeam remains fixed. While many people can readily conceive of manipulating one or two mirrors so as to maintain reflected sunlight illumination of a given area, few are actually familiar with the mechanisms involved in constructing a heliostat. These basic elements are illustrated in FIG. 1 and will be familiar to those skilled in the prior art.

Figure 1:
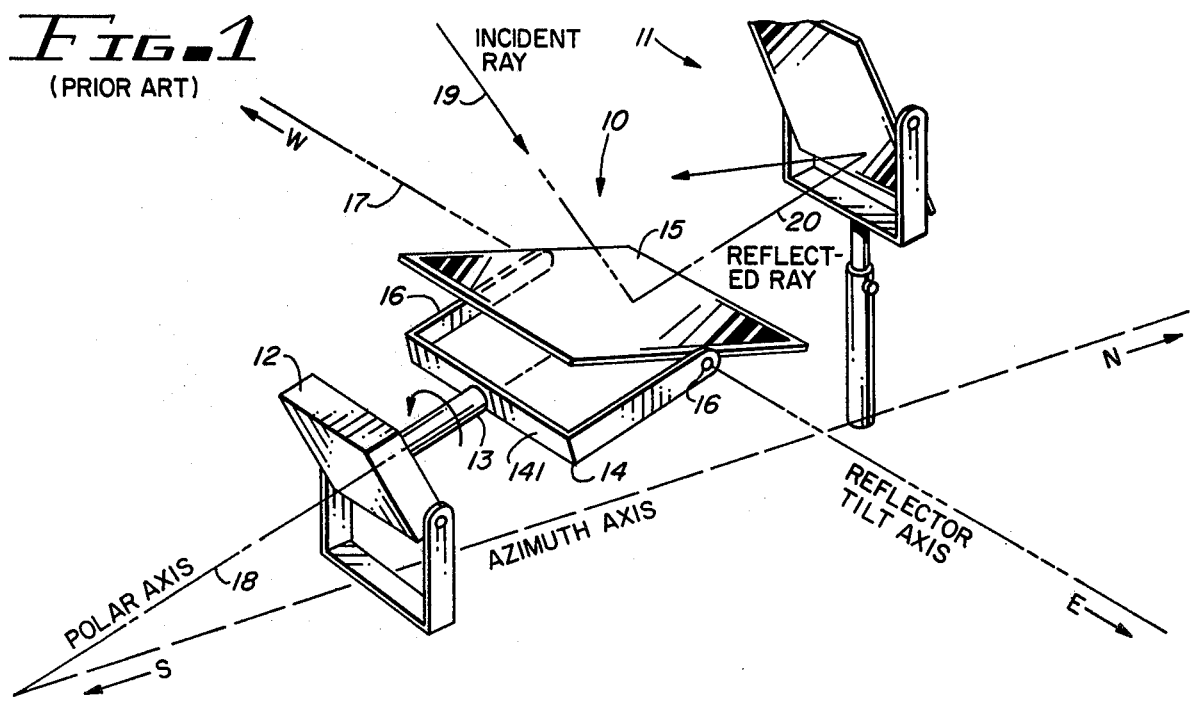
FIG. 1 illustrates a heliostat illustrating the geometrical relationships necessary for its porper functioning, shown here as providing a stationary beam of reflected light to a secondary mirror which directs this stationary beam of light to an area to be illuminated.

The heliostat 10 of FIG. 1 is comprised of a clock controlled rotary drive mechanism 12 coupled to shaft 13 which in turn is coupled to yoke 14. Yoke 14 supports mirror 15 in a manner which enables it to be tilted about the axis defined by supports 16. In practice, clock drive 12 will usually be a synchronous drive mechanism whose speed of rotation is determined by the frequency of the source power supplied to the drive motor and the gearing selected to couple the drive motor shaft to shaft 13. Rotating shaft 13 is centered so as to rotate about the polar axis which extends from the location of the equipment on Earth to the celestial pole and lies in a north-sourth meridian plane. Mirror support points 16 define a line which will be referred to hereafter as reflector tilt axis 17. Tilt axis 17 intersects polar axis 18 at right angles and lies always in an east-west plane perpendicularly intercepted by polar axis 18. In practice, base 141 of yoke 14 will be parallel to the reflector tilt angle and thus its intersection with polar axis will be a right angle.

In operation, heliostat 10 is adjusted, or initialized, by rotating shaft 13 to bring reflector tilt axis 17 into such position that its intersection with incoming, or incident, rays of the sun form a right angle. This sets clock drive mechanism 12 to local solar time. The tilt angle of mirror 15 with respect to the polar axis is then adjusted so that the sun's incident ray 19 strikes the mirror at the proper angle to cause a reflected ray 20 to exit from mirror 15 along or parallel to polar axis 18. Thereafter, during the daylight hours, the reflected ray from the mirror will remain fixed for one to several days pending upon the rate of variation of solar declination and the deviation between solar and local time. As indicated in FIG. 1, secondary mirror 11 may be positioned to direct the reflected beam coming from heliostat 10 so as to illuminate a desired area. Several such mirrors may be used in this manner when necessary to change the transmission path of the reflected light. When more than one such secondary mirror is employed, it is readily apparent that the proper alignment of the heliostat is essential to good and efficient operation of the system.

Figure 2:
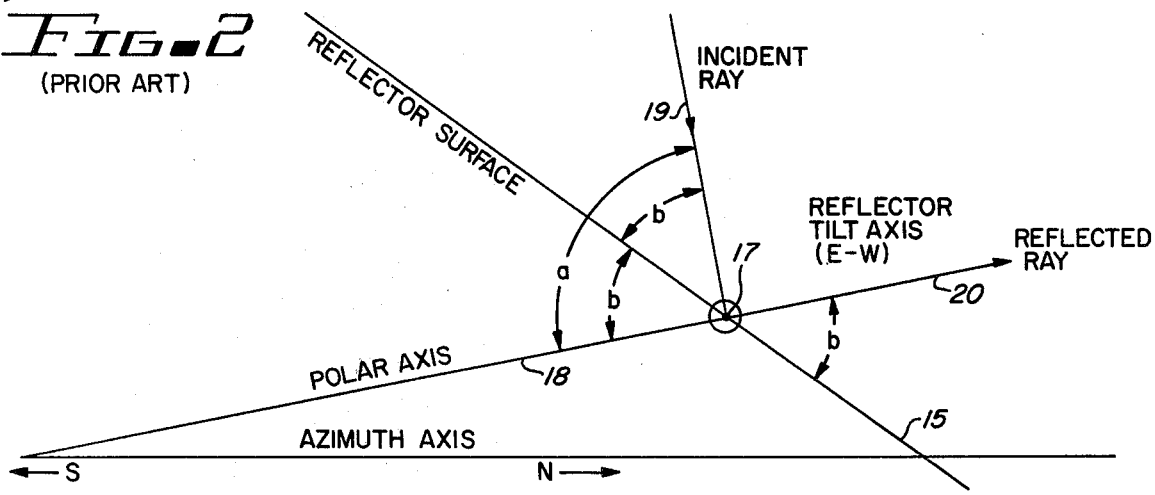
FIG. 2 illustrates the angular position at which a reflector surface must be maintained in order to reflect incident light off said reflective surface along or parallel to the polar axis of the heliostat.
Figure 4:
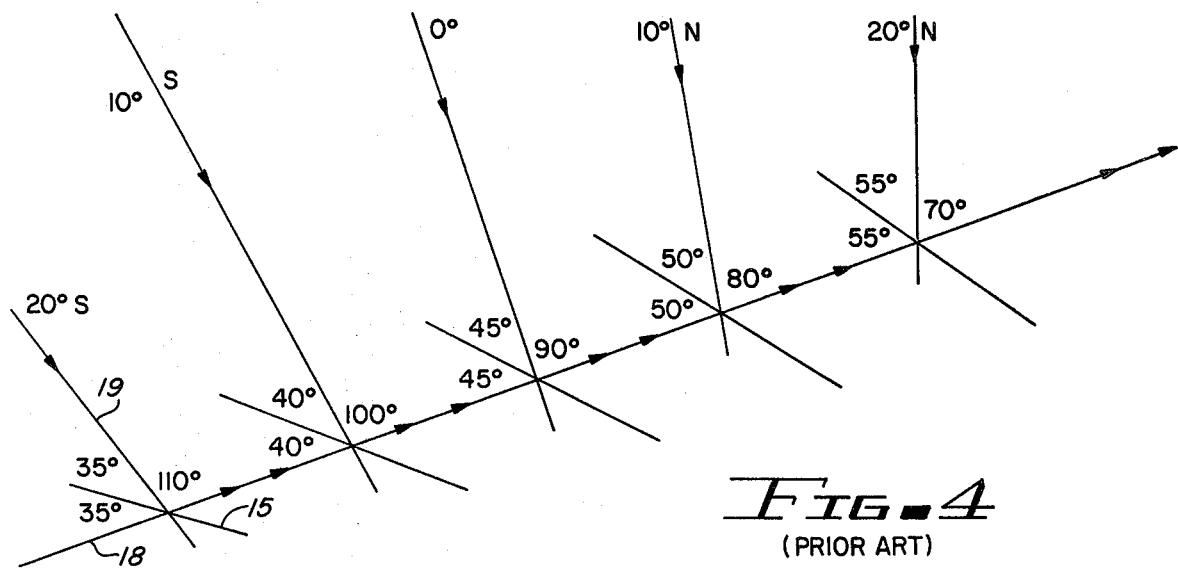
FIG. 4 is a graphic presentation of the manner in which the variation in solar declination affects the angle of tilt between the reflector surface and the polar axis.
Figure 3:
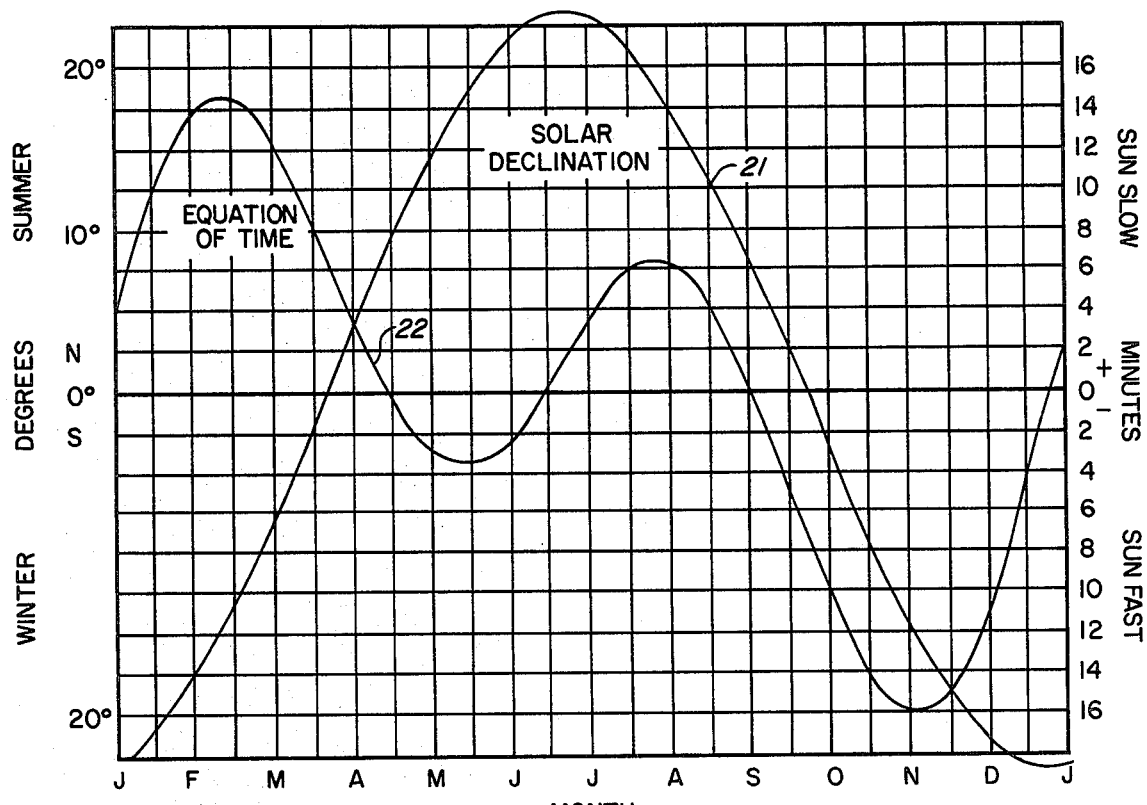
FIG. 3 is a plot indicating the annual variation in solar declination as well as the variation between sun time and local time.

The manner in which the proper tilt angle of reflector 15 with respect to polar axis 18 is determined is made clear in the geometry of FIG. 2. As this line drawing indicates, 19, an incident ray of the sun, forms an angle a with polar axis 18. In order that reflected ray 20 shall travel along or parallel to polar axis 18, it is necessary that reflector surface 15 shall intersect the polar axis at an angle b which has a magnitude equal to one-half that of angle a. The actual value of angles a and b will vary with the solar declination. A typical plot of solar declination is given by curve 21 of FIG. 3. As can be noted, the solar declination is relatively stable in the months of June and December but varies at a fairly linear rate during the other months of the year between boundaries of approximately 20° North and 20° South declination. FIG. 4 translates this variation in solar declination to a geometrical line drawing which shows the variation in the angular disposition between an incoming solar ray 19 and polar axis 18 as the sun moves between declination angles of 20° South through 20° North. FIG. 4 also correlates the required reflector tilt angle required to maintain the reflected ray 20 along or parallel to polar axis 18. Thus, as the solar declination moves from 20° South through 20° North, the reflector tilt angle varies between limits of 35° and 55°. It is well to note at this time that while the solar declination experiences a total angular change in disposition of 40° (20° South–20° North), the solar tilt angles variation was exactly one-half of that (35°–55°). The DUOCLINOMETER solar sight disclosed herein is scaled to account for this two-to-one variation between solar declination deviation and reflector tilt angle adjustment. (DUOCLINOMETER is a trademark of William A. Rhodes of Phoenix, Ariz.) A second curve 22 relates solar time to local standard time (FIG. 3). As the variations of time curve 22 indicate, the difference between solar and local time is not a constant nor is it a simple function which can be accounted for by typical simple clock work drive mechanisms such as 12. It can thus be seen that, in addition to making regular changes to the reflector tilt angle, rotary position of shaft 13 and thus that of reflector tilt angle 17 will require regular adjustment if the reflected beam is to remain stationary upon exit from reflector 15.

Figure 5:
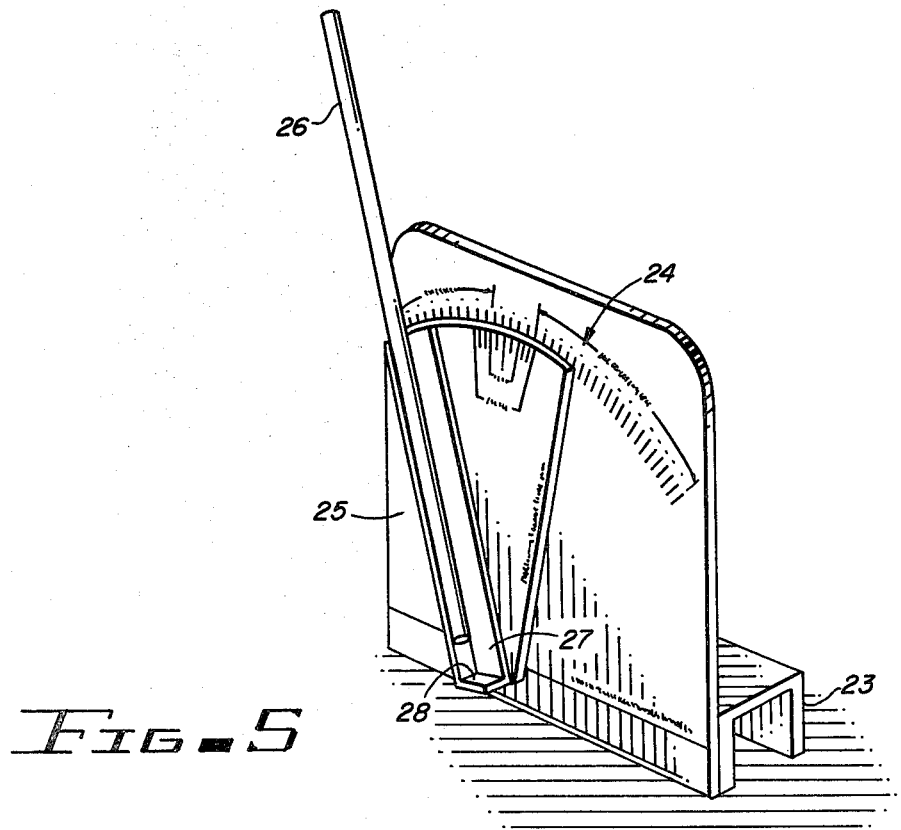
FIG. 5 is a perspective drawing of the invention illustrating its simplicity and the ease with which it may be moved about on its channel base.

FIG. 5 illustrates the invention in its DUOCLINOMETER solar sight embodiment. In this presently preferred embodiment, a simple channel element 23 serves as a base for the portable solar sight. A scale 24 is etched on face plate 25 which is supported by base 23. A diffraction tube 26 is pivoted about the position of pivot lock 27. When the diffraction tube is pivoted and the base oriented so that the diffraction tube is directed toward the sun, a Fresnel diffraction pattern will be presented on viewing surface 28. Alignment of the tube with the sun such that it is pointed directly at the orb and its walls are parallel to the incoming solar rays will be indicated on the viewing surface by a Fresnel diffraction pattern which is a generally a uniform bright gray surrounded by a dark annulus. The diffraction pattern presentation will be discussed in greater detail hereinafter.

Figure 6:
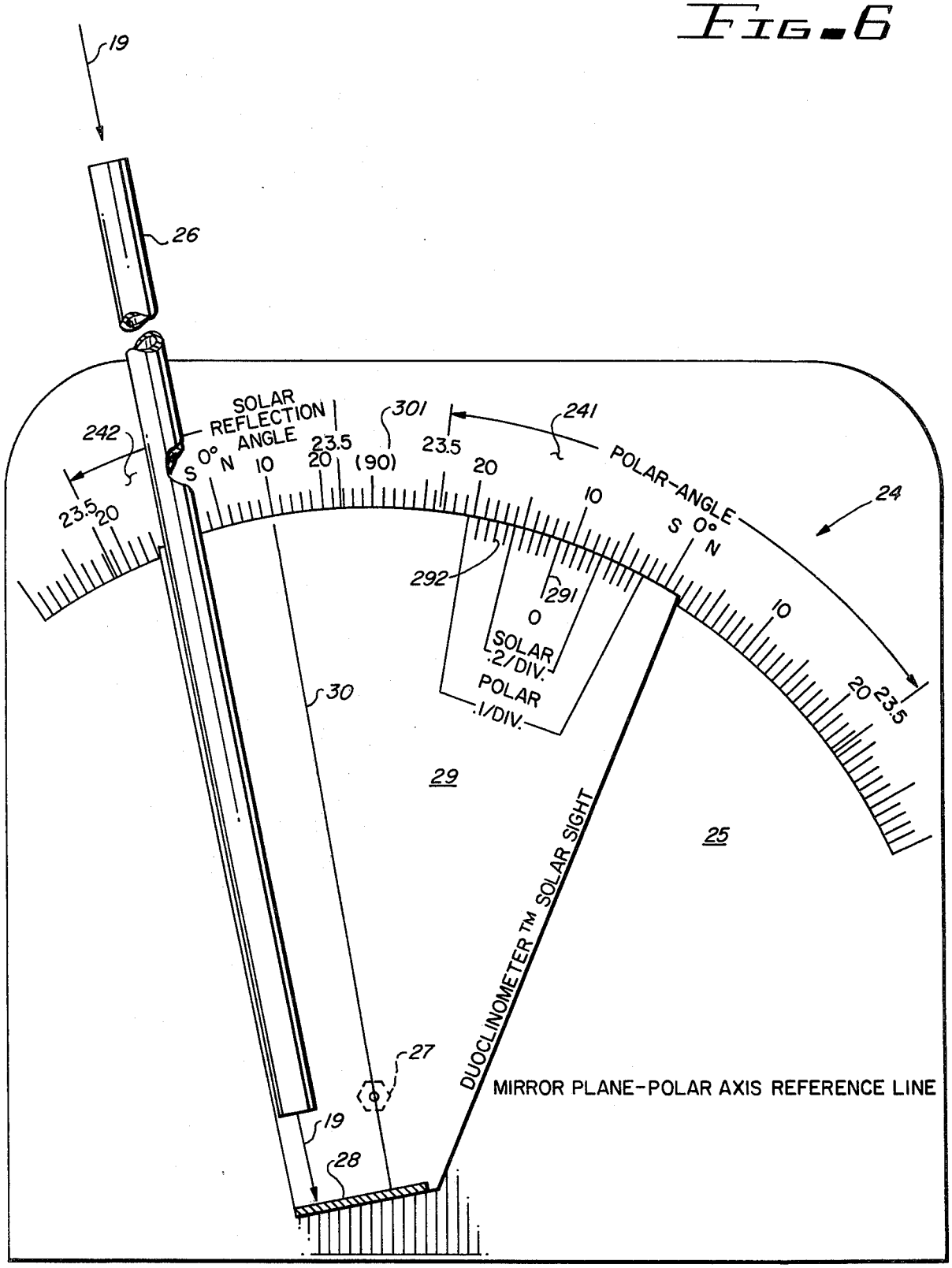
FIG. 6 is a detail drawing illustrating the scale arrangement on the solar sight and the manner in which the solar declination may be read from the scale and the mirror reflection angle determined by adjustment of the diffraction tube in accordance with a second portion of the scale.

The details of scale 24 and their relationship to the position of diffraction tube 26 will be better understood upon reference to FIG. 6. In FIG. 6, face plate 25 is reproduced so as to fully detail scale 24. The scale 24 shown covers 100° of arc graduated in one degree increments. Scale 24 has two segments which are primarily utilized in aligning a heliostat. The polar segment 241 is utilized when base 23 of the solar sight is aligned parallel to the polar axis and the diffraction tube 26 directed at the sun. The angle read-off scale segment 241 will then be the solar declination. As may be seen from FIG. 6, diffraction tube 26 is coupled to vernier plate 29 on which is scribed an index 291 and a vernier scale 292. Vernier plate 29 pivots about the position of pivot lock 27 (shown in phantom view in FIG. 6 for clarity of detail). To provide ease of reading of the scales without interference with the position of diffraction tube 26, the scales of the 0 indices have been rotated 30° to the right in the drawing of FIG. 6. A true solar ray alignment index 30 is provided on vernier plate 29. When diffraction tube 26 is pointing directly at the sun, as indicated by the bright uniform gray diffraction pattern on viewing surface 28, the sun's rays will be falling parallel to the true solar ray alignment index 30. By aligning the true solar ray alignment index 30 with index 301 of scale 24, marked 90°, true solar ray alignment index 30 will be perpendicular to the surface upon which channel base 33 is set. This scale position will be utilized in setting the clock drive mechanism 12 to solar time.

The second segment 242 of scale 24 is calibrated in terms of the reflector tilt angle at which the reflector must be set in order to direct reflected solar rays along or parallel to the polar axis of the heliostat. A review of FIG. 4 will recollect the fact that a 2:1 ratio exists between the variation of solar declination and the reflector tilt angle. Thus scale 242 is read with each scalar division indicating 0.2°. This compression of scales must be remembered when vernier scales 292 are utilized. Vernier plate 29 is properly marked to remind the user of the scaler compression. In all other respects, the vernier scale is conventional and its use will be readily understood by those having ordinary skill in the measuring arts.

The procedure for using the DUOCLINOMETER solar sight to align a heliostat such as depicted in FIG. 1 will now be disclosed. The use of a channel element for base 23 will be seen to facilitate the alignment procedure. It will be assumed at this time that heliostat 10 has been properly oriented such that the axis of shaft 13 coincides with polar axis 18. Channel base 23 of the solar sight is placed astraddle yoke base element 141. With true solar ray alignment index 30 set to 90° index 301 on scale 24 of the solar sight, or clinometer, shaft 13 and yoke 14 are rotated until the diffraction pattern on viewing screen 28 at the output of diffraction tube 26 indicates that diffraction tube 26 is pointed directly at the sun. Since channel base 23 straddles yoke base 141, the longitudinal axis of channel base 23 will remain parallel with the longitudinal axis of yoke base 141 when the solar sight is tilted in a manner so as to rotate it about the longitudinal axis of yoke base 141. The ability to rotate the solar sight about this axis at the same time as shaft 13 is rotated permits the positioning of yoke 14 and solar sight diffraction tube 26 so as to assure that incoming solar rays are incident on yoke base element 141 at 90°. In doing so, reflector tilt axis 17 has been brought orthogonal to the incident solar rays. At this point, rotary shaft 13 is locked to clock drive mechanism 12. The rotation of reflector tilt axis 17 about polar axis 18 has now been set to agree with local solar time.

Channel base 23 of the solar sight is then placed astraddle rotary shaft 13. The channel base 23 is then rotated about the polar axis rotary shaft 13 and diffraction tube 26 is rotated about the position of pivot lock 27 until a diffraction pattern appears on viewing surface 28 which indicates that diffraction tube 26 is pointed directly at the sun. At this time, the solar declination may be read from polar angle scale 241 opposite the vernier index 291. The scale markings on polar angle scale 241 are established to indicate a 0° declination when the sun's rays fall perpendicular to the polar axis rotary shaft 13. Scale 241 has a central reading of 0° declination with limits of 23.5° South declination and 23.5° North declination.

Once the solar declination angle has been determined, vernier index 291 is moved to solar reflection angle scale 242 by rotating diffraction tube 26 about position of pivot lock 27. Diffraction tube 26 is positioned so as to align vernier index 291 to the same declination angle on scale 242 as was originally determined on polar angle scale 241. The operator must use care in so adjusting the diffraction tube 26 to its new position, remembering that solar reflection angle scale 242 is compressed so as to comprise an arc on scale 24 which is only one half that of polar angle scale 241. The reason for this compression of scale was pointed out earlier in this disclosure in the discussion of FIG. 4.

With diffraction tube 26 adjusted to bring vernier index 291 to the solar declination as indicated on solar reflection angle scale 242, the solar sight is placed atop reflector surface 15 such that the longitudinal axis of channel base 23 lies perpendicular to reflector tilt axis 17. The tilt of reflector 15 about reflector tilt axis 17 is now adjusted so as to provide a diffraction pattern on viewing surface 28 of the solar sight which indicates that diffraction tube 26 is now pointing directly at the sun.

The heliostat is now properly aligned as to provide a reflected beam output from reflector 15 which reflected beam will remain stationary as the sun traces its apparent path across the sky.

Once the operator becomes familiar with the use of the DUOCLINOMETER solar sight, the alignment procedure will take but a moment, typically a minute or less. Equipped with a knowledge of the sun's declination and the variation between sun and local time, the operator will readily learn to anticipate such variations in the sun's position and will compensate in the alignment procedure to anticipate such changes. By offsetting the alignment of the heliostat slightly, the interval between alignment operations may be extended as much as five days without discernably derogating the useful light output of the system as observed at the area illuminated by the reflected light beam.

Figure 7:
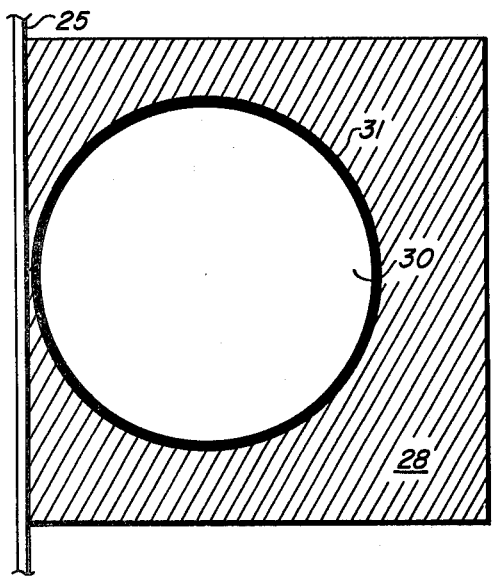
FIG. 7 illustrates the Fresnel diffraction pattern resulting when the diffraction tube of the solar sight is pointed directly at the sun such that the longitudinal axis of the diffraction tube lies parallel with the sun's rays.
Figure 8:
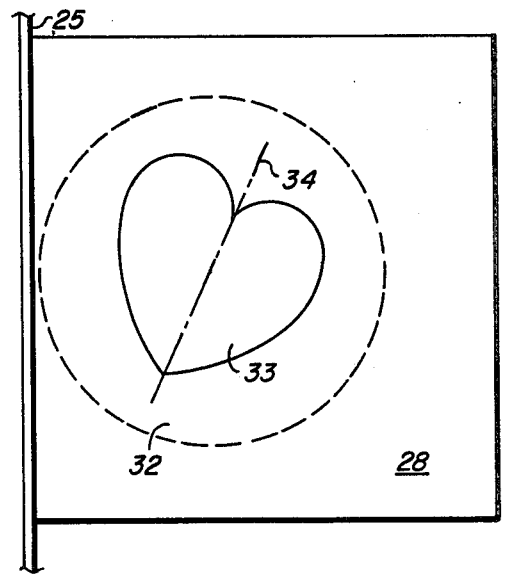
FIG. 8 illustrates the cardioid diffraction pattern resulting when the diffraction tube is not precisely aligned so as to point directly at the sun.

Some mention should be made of the presentation on viewing surface 28 of the output of diffraction tube 26 when said diffraction tube is pointed toward the sun. When diffraction tube 26 is pointed directly at the sun, the presentation appears to be that of a shadow cast by the cylindrical wall of diffraction tube 26 with this dark circular shadow brightened by the sunlight traveling down through diffraction tube 26. Such a pattern is indicated in FIG. 7. Variations from this desired pattern, such as indicated in FIG. 8, may be explained in terms of sunlight entering the diffraction tube at oblique angles and reflecting off the interior walls thereof. However, it is believed that the visual pattern displayed on viewing surface 28 is an actual diffraction pattern caused by the sun's rays' passage through the small circular opening of diffraction tube 26. When diffraction tube 26 is pointed directly at the sun, the image suggested by FIG. 7 is presented on viewing surface 28. A bright gray region 30 appears surrounded by sharply defined dark annulus 31. While brightly illuminated, area 30 is not as bright as surrounding regions on which the sun's ray is impinging. The character of the grayish illumination suggests the series of Fresnel diffraction rings observable when light is projected through a circular opening in a screen and onto a viewing surface. This diffraction pattern is barely discernable to the unaided eye but the character of the illumination on viewing screen 28 strongly suggests that it is there. Further, while it is true that when the sun's rays fall parallel to the central axis of diffraction tube 26, its cylindrical wall must cast a circular shadow, in utilizing the solar sight it is observed that with diffraction tube 26 pointed directly at the sun so as to obtain a pattern such as illustrated in FIG. 7, minor variations in the angular disposition of the diffraction tube will cause a shadow of the tube to appear on the viewing screen without discernably affecting the intensity of the sharp dark annulus 31. Thus, the pattern of light falling on viewing surface 28 is believed to be a true diffraction pattern.

A distinctive pattern is presented on viewing surface 28 when diffraction tube 26 is pointed toward but not directly at the sun. Such a pattern is suggested by the illustration of FIG. 8. A circular area 32 may be observed having within it a cardioid 33. This cardioid looks like the full, plump heart characteristic of Valentine gifts and greetings. The cardioid is symmetrical about axis 34 which passes through both the cleft and the point of the heart. As the angular disposition of diffraction tube 26 is varied about the position of pivot lock 27, the cardioid and its background undergo graytone inversions. If the heart, as first observed is quite dark, the background will be light. Adjustment of the angular disposition of diffraction tube 26 will cause the heart to appear as a light graytone against a dark background. So, too, a physical inversion of cardioid 33 on axis 34 takes place. As diffraction tube 26 is rotated about the position of pivot lock 27, the cleft and the point of the heart appear to merge and the heart reforms itself in an inverted position with the point where the cleft had originally been.

The cardioid pattern of FIG. 8 is a useful aid in bringing the solar sight into proper position in aligning both channel base 23 and diffraction tube 26 so as to cause diffraction tube 26 to bear directly at the sun. It is observed that rotation of the channel base 23 so as to bring one end of its longitudinal axis more easterly or more westerly will cause a rotation of the angular disposition of axis 34 of the cardioid 33 as it is presented on viewing surface 28. When viewing the heart-shaped presentation 33, the observer may easily imagine axis 34 intersecting the point of the heart and its cleft. Rotation of the solar sight about base 23 as suggested will permit the observer to bring the cardioid axis 34 perpendicular to the plane of face plate 25 of the solar sight. When this has been accomplished, the angular disposition of sight tube 26 may be simply adjusted about the position of pivot lock 27 to bring the tube to bear on the sun and to cause the diffraction pattern such as illustrated in FIG. 7 to appear on the viewing surface 28.

The DUOCLINOMETER may not only be used to align the heliostat to account for solar variations in elevation angle and deviation from local time but may also be utilized in initially establishing the heliostat equipment on site in determining its disposition with respect to the polar axis and the true north-south meridian.

When the heliostat is initially established at its working site, it should be placed upon a level platform. Using techniques familiar to those in the surveying art, polar axis rotary shaft 13 may be adjusted to bring its longitudinal axis so as to lie in the north-south meridian plane. Reference may be had to an ephemeris to determine the solar declination for the specific date at that site. Index 291 on vernier plate 29 is then set at this declination angle as read on polar angle scale 241. The solar sight is then placed on the heliostat such that channel base 23 lies along polar axis rotary shaft 13. In this position, the longitudinal axis of channel base 23 will be parallel with the longitudinal axis of polar axis rotary shaft 13. The solar sight is now rotated slightly about rotary shaft 13 while maintaining channel base 23 in contact with said shaft. This is done to direct diffraction tube 26 as near to the sun's situs as is possible. Having done this, the elevation axis of the heliostat is adjusted up or down to bring diffraction tube 26 to bear directly at the sun. The combination of these two adjustments is continued, that is, adjustment of the position of channel base 23 about the axis of rotary shaft 13 and the adjustment of the elevation axis of the heliostat, until the diffraction pattern presented on viewing surface 28 indicates that the heliostat elevation angle has been established at a position at which diffraction tube 26 may be aimed directly at the sun. This operation will place the longitudinal axis of rotary shaft 13 within plus or minus one-fifth degree of the polar axis, without compensating for the error between zero hours Universal Time and longitude of the heliostat location. By calculating out this error and setting the elevation angle of the heliostat at or near noon in any time zone, the axis of rotary shaft 13 and the polar axis will be within 0.1°, which for practical purposes is sufficient for all cases at all locations from the Equator through maximum practical northern or southern limits at which a heliostat might be utilized.

The DUOCLINOMETER solar sight may now be utilized to verify that the elevation axis of the heliostat is correct and that it lies precisely in a meridian plane.

To do so, the solar sight is set with its base 23 along the polar axis rotary shaft 13. Diffraction tube 26 is then brought to bear directly at the sun as indicated by the diffraction pattern on viewing surface 28. The declination angle of the sun is then read on scale 241 as indicated by vernier index 291. Three such readings are required. Three such readings are taken with the time between successive readings being equal. It is suggested that no such readings be taken before 8 A.M. or after 4 P.M. since at these times atmospheric refraction of the sun's rays will cause the orb to appear above the horizon when in actuality that celestial body is below the horizon. For best results, it is suggested that observations be limited to the period between 9 A.M. and 3 P.M.. The results of these readings must be related to the length of the solar day, 12 hours. Thus, in a series of readings taken over a period of 6 hours (e.g. 9 A.M.-3 P.M.) the magnitude of any angular errors in the setting of the heliostat as determined by these three readings must be multipled by two to determine the true error. So if the series of three readings is taken over a three hour period, the indicated error must be corrected by multiplying by four to obtain the true error present in the siting of the heliostat.

Figure 9:
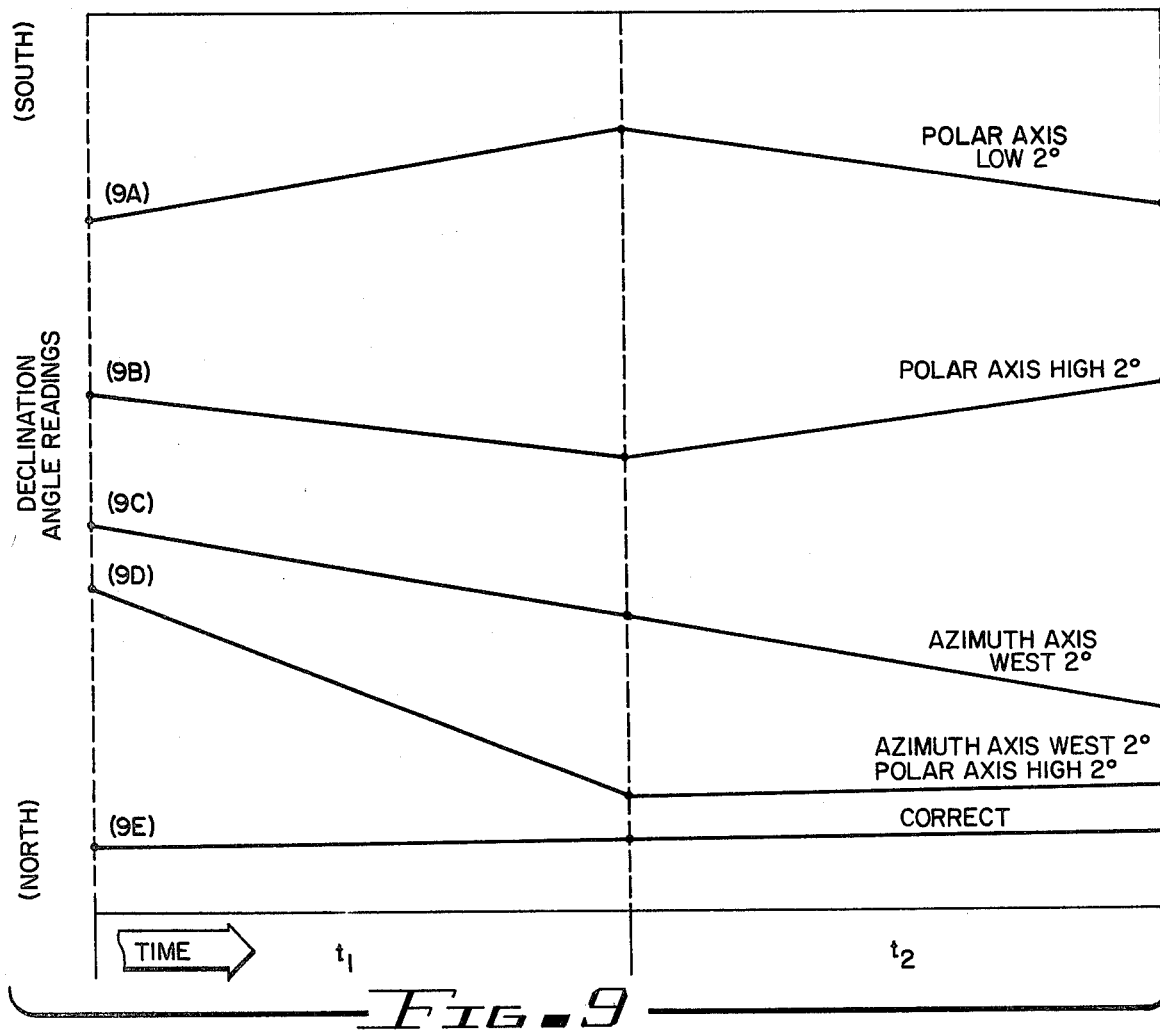
FIGS. 9A-E illustrate graphical plots of solar declination measurements made in the course of a day to determine whether error exists in heliostat alignment with polar axis and meridian plane.

The declination angle as read from polar angle scale 241 is then graphically plotted as indicated in FIGS. 9A-9E. The three readings are connected by straight lines and it is found that the characteristic shape of the resultant graphic figure is determinative of the magnitude and the type of error present in siting the heliostat. In either FIG. 9A or 9B it is noted that the first reading of the day indicates the same solar declination as did the last reading. However, the central reading in each of these figures would not lie on a straight line drawn between the first and last readings of the day. In FIG. 9A the central reading taken from scale 241 of the solar sight indicates a more southerly declination than that of the reading at either end point. This southerly declination indicates that the polar axis is too low. Conversely, the northerly declination of the central reading in FIG. 9B illustrates that the polar axis has been set too high. Experiments with the DUOCLINOMETER solar sight have shown that a dependable ratio exists between the first and last readings, assuming that they are the same declination angle indicating that the heliostat has been properly aligned in azimuth. It is found that the middle reading will be 26% greater than the deviations on either side if the angle of the polar axis is incorrect. Thus, if the central reading is 2.7° higher or lower than the identical end readings, the longitudinal axis of rotary shaft 13 should be raised or lowered 2°. Upon making this adjustment, the three readings will be in alignment as is indicated in FIG. 9E. As FIG. 9E indicates, if the graph is straight and goes through all three reading positions, the operator has set both azimuth and altitude correctly. However, as the other graphs indicate, if the line deviates from center to either side, then it is obvious that either azimuth or elevation or both should be corrected to produce the straight line. The plot of FIG. 9C, which is a straight line but which provides different declination readings in the first and the last readings of the set of three, indicates that the azimuth axis is in error. In the graph of FIG. 9C, the azimuth axis was offset westerly 2°. In the plot of FIG. 9D, the heliostat had both an azimuth axis error westerly 2° and a polar axis error that was high or northerly 2°.

What I have described is a solar sight which is portable and can be readily utilized in aligning a heliostat. Sightings of the sun are taken using a diffraction tube which provides a diffraction pattern on a viewing surface so as to indicate when the diffraction tube is pointed directly at the sun. In the embodiment herein disclosed, it was determined that a diffraction tube length/diameter ratio of 34 provided an optimum diffraction tube commensurate with ease of correction while not being so position-sensitive as to be impractical to hold an alignment on the sun. L/D ratio (length-/diameter) of 34 is satisfied with a diffraction tube 12 inches long having an internal diameter of 0.350 inches. This L/D ratio provides a repeatable scale sensitivity of 3 minutes of arc. Readings taken with this diffraction tube have been found consistent even by those not skilled in its use and has proven more than adequate for fine adjustment of heliostat angles. The solar sight, when placed with its base along the polar axis of a heliostat, may be used for determining the solar declination at the locus of the heliostat on any given day. The scale of the solar sight provides means for transfering the solar declination to a reflector angle scale so that the heliostat reflector will cause a sunbeam striking it to be reflected along or parallel to the polar axis. The solar sight disclosed may be utilized at the time the heliostat is initially established at its working location to accurately establish the elevation and azimuthal disposition of the heliostat elements. Those skilled in the prior art will recognize the changes or modifications may be made in the embodiment of the invention taught herein without departing from the spirit and scope of the invention as claimed herein.

Having described my invention in such clarity of detail in the foregoing specification and the accompanying drawings that those skilled in the art may easily and simply practice it, that which I claim is:

1. An optical device for determining when the device is aligned with a source of visible radiation comprising:
   a hollow, empty, cylindrical tube having two open ends and a longitudinal axis, said tube having a substantially constant length to internal diameter, L/D ratio; and
   a substantially opaque viewing surface mounted relative to one end of said tube so that said surface is substantially perpendicular to the longitudinal axis of the tube, the L/D ratio of the tube being such as to produce a distinct pattern on said viewing surface when the source of radiation substantially lies on the longitudinal axis of the tube.

2. An optical device as defined in claim 1 in which the source of radiation is the sun.

3. An optical device as defined in claim 2 in which the L/D ratio of the tube is substantially 34.

4. An optical device as defined in claim 3 in which the internal diameter of the tube is substantially 0.350 inches.

5. A clinometer for setting a heliostat having a shaft mounted for rotation about an axis of rotation, said axis of rotation being substantially aligned with the polar axis for the location of the heliostat; means for rotating the shaft substantially in synchronism with the movement of the sun; a yoke coupled to the shaft and a mirror having a substantially planar reflecting surface pivotally positioned with respect to a reflector tilt axis, said reflector tilt axis being substantially perpendicular to said polar axis; said clinometer comprising:

base means for positioning the clinometer on the shaft, the yoke, and the mirror of the heliostat;

a substantially planar face plate mounted on the base means;

a vernier plate pivotally mounted on the face plate;

a hollow sight tube having a longitudinal axis mounted on the vernier plate, said hollow sight tube having a substantially constant length to internal diameter, L/D ratio;

an opaque viewing surface mounted on the vernier plate substantially perpendicular to the axis of said tube, the L/D ratio of the sight tube being such as to produce a distinct visible pattern on the viewing surface when the sight tube is substantially aligned with incident solar radiation; and scales on the face plate and vernier plate for setting the reflector tilt axis so that it is substantially perpendicular to incident solar radiation, for measuring the declination of the sun relative to the shaft of the heliostat, and for determining the solar reflection angle of the mirror.

6. A clinometer as defined in claim 5 in which the hollow sight tube does not have any optical devices mounted in it.

7. A clinometer as defined in claim 6 in which the L/D ratio of the tube is substantially 34.

8. A clinometer as defined in claim 7 in which the diameter of the tube is substantially 0.035 inches.

9. A clinometer as defined in claim 8 in which the base means is a channel element.

* * * * *